United States Patent
Jordan et al.

(10) Patent No.: US 8,526,150 B2
(45) Date of Patent: Sep. 3, 2013

(54) CENTRAL CONTROL AND INSTRUMENTATION SYSTEM FOR A TECHNICAL INSTALLATION AND METHOD FOR OPERATING A CENTRAL CONTROL AND INSTRUMENTATION SYSTEM

(75) Inventors: Carsten Jordan, Erlangen (DE); Guido Steinhauer, Büchelberg (DE); Michael Unkelbach, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 512 days.

(21) Appl. No.: 12/677,824

(22) PCT Filed: Sep. 12, 2008

(86) PCT No.: PCT/EP2008/062166
§ 371 (c)(1),
(2), (4) Date: Sep. 28, 2010

(87) PCT Pub. No.: WO2009/037199
PCT Pub. Date: Mar. 26, 2009

(65) Prior Publication Data
US 2011/0006602 A1    Jan. 13, 2011

(30) Foreign Application Priority Data
Sep. 13, 2007  (DE) .......................... 10 2007 043 794

(51) Int. Cl.
*H02H 3/00* (2006.01)
(52) U.S. Cl.
USPC ................................. 361/62; 700/5

(58) Field of Classification Search
USPC ............................................. 361/62; 307/31
See application file for complete search history.

(56) References Cited

U.S. PATENT DOCUMENTS

| 4,354,225 | A | * | 10/1982 | Frieder et al. ..................... 711/5 |
| 5,436,855 | A | | 7/1995 | Willafys et al. |
| 5,752,008 | A | | 5/1998 | Bowling |
| 7,094,995 | B2 | * | 8/2006 | Mills ............................. 219/492 |
| 7,368,686 | B2 | * | 5/2008 | Etheredge et al. ............ 219/412 |
| 7,493,362 | B2 | * | 2/2009 | Bogatin et al. ................ 709/203 |

FOREIGN PATENT DOCUMENTS
| DE | 112005001040 T5 | 4/2007 |
| WO | WO 9745778 A1 | 12/1997 |

OTHER PUBLICATIONS
"Testen ohne einzubauen" Elektrotechnik, 331951, Nov. 19, 1990, pp. 26-28, 30, 33, vol. 72, Nr. 11, 19, XP 1757676.

* cited by examiner

*Primary Examiner* — Rexford Barnie
*Assistant Examiner* — Joseph Inge

(57) ABSTRACT

A central control and instrumentation system with a plurality of functional modules interconnected by data transmission is provided. The functional modules are monitored by a central control module. Functional modules with a data output after completing a predefined number of action cycles, which are specific to each module, allow a provision of a fast motion functionality for simulation purposes and are subjected to a correction parameter of the number of action cycles for a user-controlled variation of the respective cycle to be completed.

12 Claims, 1 Drawing Sheet

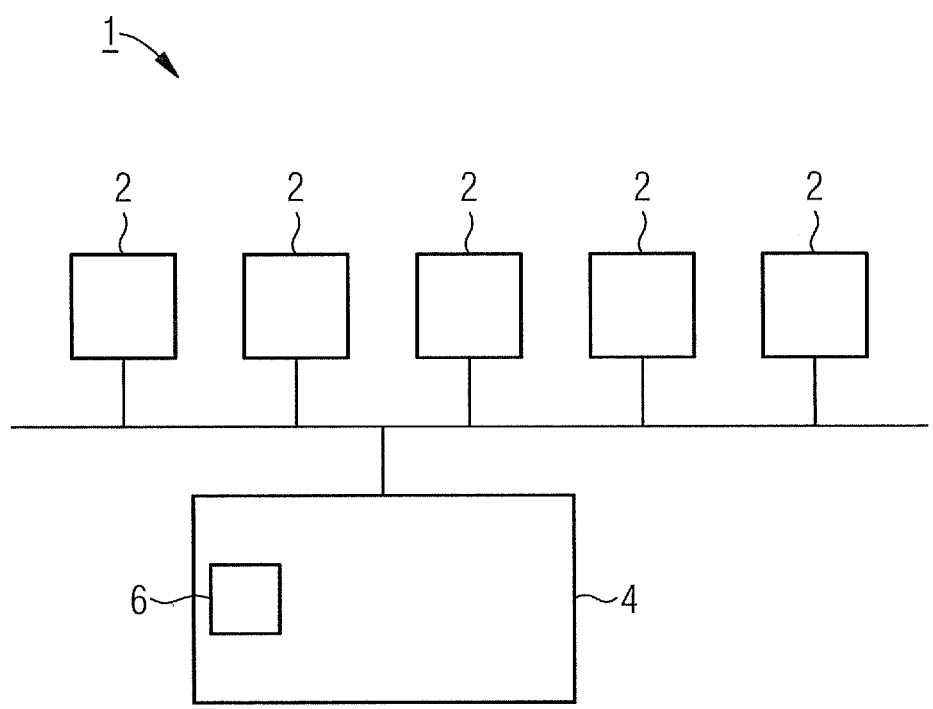

CENTRAL CONTROL AND INSTRUMENTATION SYSTEM FOR A TECHNICAL INSTALLATION AND METHOD FOR OPERATING A CENTRAL CONTROL AND INSTRUMENTATION SYSTEM

CROSS REFERENCE TO RELATED APPLICATIONS

This application is the U.S. National Stage of International Application No. PCT/EP2008/062166 filed Sep. 12, 2008 and claims the benefit thereof. The International Application claims the benefits of German Application No. 10 2007 043 794.5 DE filed Sep. 13, 2007. All of the applications are incorporated by reference herein in their entirety.

FIELD OF INVENTION

The invention relates to a central control and instrumentation system for a technical installation, in particular a power station, comprising a plurality of functional modules which are interconnected for data communication purposes and monitored by a central control module. It further relates to a method for operating a central control and instrumentation system of said type.

SUMMARY OF INVENTION

In large-scale technical installations such as, for example, power stations or the like, process control systems or central control and instrumentation systems are typically deployed for the purpose of monitoring and controlling the system processes. Central control and instrumentation systems of this type typically comprise a multiplicity of functional modules or the like, each of which performs a specific task in the monitoring and control of the system processes, for example the monitoring and control of individual components, the acquisition of specific process parameters, the management and control of the data streams being generated or the like. In so doing the functional modules typically exchange a multiplicity of data with one another in a suitable manner as a function of situation and state.

For suitable control and activation of the functional modules as well as for monitoring the general process flow in a central control and instrumentation system of the aforesaid kind, the functional modules, which for their part can be configured as independent hardware components, as software modules or as hybrids thereof, are typically assigned a higher-ranking central control module which monitors and where necessary controls the general data transfer as well as the orderly sequence in the processing of the data streams being generated. The functional modules in particular are suitably controlled by way of a central control module of said type, which is sometimes also referred to as a "scheduler" or "task manager", and after being supplied with suitable input data are prompted to output corresponding output data that is dependent on the respective function of the module.

Especially in central control and instrumentation systems in highly complex large-scale technical installations there is generally a requirement to monitor and control a multiplicity of components having highly complex process flows. Particularly in such types of central control and instrumentation systems, which accordingly have a comparatively high degree of complexity in terms of the number, configuration and structure of their respective functional modules, proper adherence to specified message sequences or possibly also to message sequences conforming to external standards is usually of particular importance for orderly program execution and data exchange and hence also for a high level of operational reliability. In this case it is important in particular to ensure that the functional modules are controlled in a suitable and timely manner such that the output data supplied by them in each case, which in turn is required as input data for other functional modules, is available at the right time and can be forwarded in a suitable form to the destination functional module. Furthermore, there is a general requirement for the proper management of such highly complex processes to provide suitable data streams and maintain the synchronization of heterogeneous units with one another with exactitude.

In order to enable this, but on the other hand also to ensure a sufficiently high quality in the calculation of intermediate results and the like, some or all of the aforesaid functional modules can be controlled or configured in a central control and instrumentation system of said type on the basis of action cycles. In the case of an action cycle of this kind—dependent on the respective functional module and its basic configuration—following the activation or triggering of the respective functional module an action cycle suitably provided therein is executed a number of times and repeatedly until a desired end state is reached. The action cycle can in this case consist, for example, simply of a counting mechanism, with the result that given suitable specification of a desired cycle number by the programmer it can be ensured that a functional module controlled in such a manner, after executing the specified number of counting cycles, i.e. only after a waiting time or delay conditional thereon, outputs an output signal, for example an actuating signal or an intermediate result, to another functional module or to the central control unit.

Alternatively, however, it can also be provided in a functional module, for example, that an integration cycle for a measured value or the like is provided as an action cycle, wherein in order to ensure a sufficiently high quality of result it is specified that multiple passes are to be made through an integration cycle of said kind, namely according to a number that is specifiable by the programmer. By having recourse to action cycles of said type and the number of cycles to be executed by the respective module, as specified on a module-specific basis by the programmer in each case, the data exchange and in particular the timing and the coordination between the individual functional modules can thus be suitably set in accordance with the higher-ranking process control workflow schedule for the central control and instrumentation system and where necessary modified by the programmer.

On the operator side the highly complex nature of the process flows that are to be mastered for large-scale technical installations, the multiplicity of parameters to be taken into account therein, and the typically large number of deployed components usually result also in a comparatively complex operating and control structure of the central control and instrumentation system per se, which factors for example also result in a comparatively complex control room and correspondingly complex user interfaces of the central control and instrumentation system. For these reasons, and also to familiarize the operating personnel in a purposeful manner with the process flows to be managed, extensive instruction and comprehensive training programs are generally necessary for the operating personnel of the central control and instrumentation systems of large-scale technical installations. During these training programs, scenarios which are actually undesirable or unexpected such as, for example, malfunctions or the like are also simulated in addition to the operational situations noimally to be expected in the respective technical installation. In this case the central control and instrumentation system, decoupled from the actual state of the installation, is subjected to corresponding system parameters that are suitable for simulating the desired state in a particular case.

For example, in order to provide useful and effective training also for dealing with unusual situations by means of suitable simulations, a so-called fast-motion functionality can be very desirable for such installations so that the process flows to be simulated can be computed and visualized faster than in the real-world state. In order to provide a fast-motion functionality of this kind the cycle rate of the central control and instrumentation system could basically be increased in the simulation mode. As a result the functional modules would operate more quickly, such that the central control and instrumentation system in its entirety would provide correspondingly faster process execution. Especially in the case of complex systems, however, implementing a fast-motion functionality by means of a corresponding increase in the cycle rate is only possible to a limited degree, since this kind of intensification of the computing activities would lead directly to a commensurate additional load on the hardware computer modules, in particular the CPU, since the latter can be loaded only to a limited degree.

Alternatively the aforesaid fast-motion functionality could be provided by means of a reconfiguration of all time-dependent parameters in the system configuration, which reconfiguration would correspond to the behavior of the installation in the case of a correspondingly increased cycle time. Toward that end corresponding time or timer values in the components could be halved, for example, and the integration constants in integrator modules increased by a factor of 2 in order to obtain a fast-motion functionality by the factor 2. In an implementation of a fast-motion functionality of this kind, however, all of the constants within the program structure of the central control and instrumentation system would have to be modified in accordance with the desired fast-motion factor. In complex installations in particular, the overhead required for this cannot be justified.

An object of the invention is therefore to disclose a central control and instrumentation system for a technical installation of the aforementioned type by means of which a fast-motion functionality can be provided in a comparatively simple manner, in particular for simulation purposes. A further object is to disclose a suitable method for operating a central control and instrumentation system of said kind.

With regard to the central control and instrumentation system, this object is achieved according to the invention in that in order to enable the user-controlled variation of the cycles to be executed in each case a cycle number correction parameter can be applied to a number of those functional modules in which a data output is performed on completion of the execution of a number of action cycles specified on a module-specific basis.

The invention is in this case based on the consideration that in order to provide a fast-motion functionality in a reliable manner while avoiding the cited disadvantages there should be neither an intervention to alter the actual cycle time nor an intervention to modify the constants and the like stored on a module-specific basis in each case. On the other hand, in order nonetheless to achieve a reduction in the actual response time of the respective functional modules that is aimed at in accordance with the provided fast-motion functionality while maintaining the same cycle time, the number of cycles to be executed in each case up to the actual data output should be suitably modified. In the case of action cycles that are provided simply in the manner of a wait loop or a counting function for synchronization purposes, this can also be achieved without any loss in quality in the determined signals or intermediate results. In the cases in which, for example, parameter integrations or the like are performed within the scope of the action cycle, the reduction in the provided number of cycles could in fact be accompanied by a certain loss in precision, though this is generally acceptable for simulation purposes.

The fast-motion functionality is advantageously implemented uniformly for the entire central control and instrumentation system by provision of a standard or common cycle number correction parameter for all potentially affected functional modules. Said cycle number correction parameter could be, for example, a corresponding factor by which the cycle numbers controlling the respective process flow and stored internally in the respective module are suitably multiplied. By the common provisioning of a single cycle number correction parameter for all of the functional modules it is ensured in a particularly simple manner that the target cycle numbers stored in each case are re-standardized or redefined uniformly in all of the functional modules in a synchronized and mutually coordinated manner, with the result that the system in its entirety can continue operating as before in a synchronized manner and while maintaining the necessary message sequences and the like.

Providing a common cycle number correction parameter for all the functional modules can be achieved in a particular simple manner by advantageously storing the cycle number correction parameter in the central control module or in another centralized memory area that is accessible to all the functional modules. In this case the cycle number correction parameter is advantageously provided as a global parameter, in other words as a parameter that is made available on equal terms to all of the system components and can be read in for these.

With regard to the method, the aforesaid object is achieved in that functional modules which perform a data output after completing the execution of a specified module-specific number of action cycles are supplied with a cycle number correction parameter on the basis of which the number of action cycles to be executed in the respective module up to the data output is modified.

The advantages achieved by means of the invention consist in particular in the fact that by providing fast-motion functionality or an alternative execution mode suitable in particular for simulations in which it is communicated to the or each functional module how many cycles are to be executed up to the data output provided in each case, the respective functions can be executed without modifying the cycle time, wherein a computational result can nonetheless be achieved which corresponds to that of a shorter cycle time or a higher cycle frequency. In this way the desired fast-motion functionality can be achieved in a particularly simple manner without the available hardware capacity being subjected to excessive load and without the need to update individual program parameters, time constants and the like in the aforesaid functional modules.

BRIEF DESCRIPTION OF THE DRAWINGS

An exemplary embodiment of the invention is explained in more detail with reference to a drawing in which the figure schematically shows a central control and instrumentation system.

DETAILED DESCRIPTION OF INVENTION

The central control and instrumentation system 1 according to the figure is provided for the control and monitoring of the system processes in a comparatively complex technical installation, namely in the exemplary embodiment of a power station. For that purpose the central control and instrumentation system 1 comprises a multiplicity of functional modules 2, each of which is specifically configured for performing individual functions or tasks within the framework of the overall process workflow. In this case the functional modules 2 can be embodied as separate hardware components, as independent software modules or as a combination of both. By means of the individual functional modules 2 the relevant components of the power station in particular can be individually monitored and suitably controlled in respect of their operating state, wherein further functional modules 2 can be provided for the specific monitoring of measurement parameters, for determining intermediate results, for monitoring the data streams and the like.

In order to coordinate the data streams, the data exchange between individual functional modules 2 and the like, the central control and instrumentation system 1 is additionally provided with a central control module 4 which monitors and where necessary suitably controls the functional modules 2. In this case the higher-ranking control module 4, also referred to as a "scheduler" or as a "task manager", activates individual functional modules 2 as necessary and where appropriate and thereby initiates the output of suitable output signals by the respective functional module 2, which signals can be used in turn as input values for other functional modules 2.

In order to ensure an orderly signal exchange, and in particular one that is suitably staggered in time, between the individual functional modules 2 also in the case of complex program flows and comparatively multilayered data exchange between the individual functional modules 2, a plurality of the functional modules 2 are structured in terms of their configuration to be suitable for cycle control. In this case, in order to make sure that certain output signals are not output too early by the functional modules 2, and also where necessary are output with sufficiently high computing quality to guarantee reliable further processing in other functional modules 2, the said functional modules 2 are configured such that a data output, i.e. for example the output of an actuating signal, an intermediate result, a parameter value or the like, is performed by the respective functional module 2 only when the latter, after initiating the respective functionality, i.e. for example after prompting by the central control module 4, has executed a suitably stored number of action cycles specified by the programmer. These action cycles can be cycle times specified in the manner of a counter by the system-internal clock rate, wherein it is ensured by waiting for the specified number of cycle times to elapse that the said output signal is not fed in too early into the general data exchange. Alternatively, depending on the functionality of the respective functional module 2, the action cycle can also relate to other cycle types, for example integration cycles or the like, in which corresponding activities are executed cyclically and repeatedly until, for example, a computing quality considered adequate or the like is reached. In this case too, a suitable target value for the number of cycles to be executed is typically stored in the respective functional modules 2.

The central control and instrumentation system 1 is configured for providing a fast-motion functionality as needed, such as is very desirable for simulation purposes for example, with which functionality it is possible to set process scheduling speeded up by a specifiable time factor in a simulation scenario in an artificial manner. In order to enable this in a particularly simple and resource-saving manner, the central control and instrumentation system 1 is embodied for as-needed output of a user-specifiable cycle number correction parameter to the functional modules 2. To that end the central control module 4 has a specifically allocated memory area 6 in which a suitable fast-motion parameter (for example "fast-motion 3") can be stored by the user via an input device that is not shown in further detail, for example a screen-keyboard unit. After suitable conversion a cycle number correction factor is calculated from the desired fast-motion factor specified in such a way and suitably stored in the memory area 6. For the desired fast-motion factor 3, the factor 1/3, for example, is stored in this case in the memory area 6 as the cycle number with correction parameter.

When the fast-motion mode is activated in the central control and instrumentation system 1, the cycle number correction parameter stored in the memory area 6, which parameter can therefore be read out as a global parameter for all the connected functional modules 2, is output to the functional modules 2. In the functional modules 2 the target values possibly stored there for the cycle numbers to be executed are multiplied by the supplied cycle number correction parameter such that effectively a correspondingly reduced target value results for the cycle numbers to be executed in the respective functional module 2.

If one of the functional modules 2 is then controlled accordingly and the sequential execution of a plurality of cycles provided as a result is initiated, the originally stored target value, now modified by multiplication with the cycle number correction parameter, is used as the end criterion by means of which the number of cycle passes considered adequate is specified. The functional module 2 addressed in each case therefore supplies the data output already when the correspondingly reduced number of action cycles has been executed, with the result that overall a correspondingly faster response time of the respective functional module 2 occurs.

The invention claimed is:

1. A central control and instrumentation system for a technical installation, comprising:
a plurality of functional modules, each configured to perform a function or task that performs a data output after executing for a preconfigured number of cycles specified on a module-specific basis, wherein the functional modules are interconnected for data communication purposes;
a central control module in communication with the plurality of functional modules and configured control activation of the plurality of functional modules; and
a cycle number correction parameter configured to modify the preconfigured number of cycles executed by the plurality of functional modules when applied,
wherein, in order to enable a user-controlled variation of cycles to be executed without modifying a cycle time, the central control module applies the cycle number correction parameter to one or more of the plurality of functional modules to modify the preconfigured number of cycles executed by the plurality of functional modules up to the data output.

2. The central control and instrumentation system as claimed in claim 1, wherein the cycle number correction parameter is applied to all cycle-number-dependent functional modules.

3. The central control and instrumentation system as claimed in claim 1, wherein the cycle number correction parameter is stored in the central control module.

4. The central control and instrumentation system as claimed in claim 1, wherein the cycle number correction parameter comprises a fractional multiplier adapted to reduce the predetermined number of cycles resulting in a correspondingly faster response time for a respective functional module.

5. The central control and instrumentation system as claimed in claim 1, wherein the cycle number correction parameter is available as a global parameter.

6. The central control and instrumentation system as claimed in claim 1, wherein the preconfigured number of cycles comprises a stored number of action cycles to be executed prior to performing the data output.

7. The central control and instrumentation system as claimed in claim 6, wherein the action cycles to be executed are implemented by means of a counter.

8. The central control and instrumentation system as claimed in claim 1, wherein the preconfigured number of cycles comprises a stored target value for the number of cycles to be executed prior to performing the data output in an integration cycle wherein the function or task is executed cyclically and repeated until a condition is reached.

9. A method for operating a central control and instrumentation system, comprising:
  providing a plurality of functional modules, each of the plurality of functional modules configured to perform a function or task for a technical installation such that the function or task performs a data output after executing for a preconfigured number of action cycles specified on a module-specific basis, and wherein the functional modules are interconnected for data communication purposes;
  controlling activation of the plurality of functional modules via a central control module in communication with the plurality of functional modules;
  applying via the central control module a cycle number correction parameter to the functional modules configured to modify the preconfigured number of action cycles to be executed in the functional modules up to the data output based upon the cycle number correction parameter.

10. The method as claimed in claim 9, wherein the cycle number correction parameter is applied to all cycle-number-dependent functional modules.

11. The method as claimed in claim 9, further comprising:
  storing the cycle number correction parameter in the central control module.

12. The method as claimed in claim 9, wherein the cycle number correction parameter is available as a global parameter.

* * * * *